United States Patent [19]
Tan

[11] Patent Number: 5,081,690
[45] Date of Patent: Jan. 14, 1992

[54] ROW-BY-ROW SEGMENTATION AND THRESHOLDING FOR OPTICAL CHARACTER RECOGNITION

[75] Inventor: Hin-Leong Tan, Rochester, N.Y.
[73] Assignee: Eastman Kodak Company, Rochester, N.Y.
[21] Appl. No.: 520,435
[22] Filed: May 8, 1990
[51] Int. Cl.⁵ .............................................. G06K 9/00
[52] U.S. Cl. ...................................... 382/50; 382/30; 382/51; 382/9; 358/466
[58] Field of Search ............. 382/50, 9, 51, 54, 30; 358/464, 466, 455, 465

[56] References Cited

U.S. PATENT DOCUMENTS

| | | | |
|---|---|---|---|
| 3,263,216 | 7/1966 | Andrews | 382/30 |
| 3,868,637 | 2/1975 | Schiller | 382/31 |
| 4,490,852 | 12/1984 | Sahni | 382/48 |
| 4,593,325 | 6/1986 | Kannepell et al. | 358/282 |
| 4,607,385 | 8/1986 | Meada | 382/9 |
| 4,731,863 | 3/1988 | Sezan et al. | 382/51 |
| 4,742,556 | 5/1988 | Davis, Jr. et al. | 382/51 |
| 4,829,587 | 5/1989 | Glazer et al. | 382/47 |
| 4,931,881 | 6/1990 | Matsui et al. | 358/466 |

Primary Examiner—David K. Moore
Assistant Examiner—Yon Jung
Attorney, Agent, or Firm—Dennis R. Arndt

[57] ABSTRACT

During segmentation of individual characters in a column, the invention predicts for the next character an optimal minimum gray level sensitivity threshold while scanning pixel rows between characters by lowering the threshold unless or until noise in the image causes the scanner to detect too many "ON" pixels between adjacent numerals. During subsequent attempts to recognize the segmented character, the invention computes a confidence score and increases the sensitivity threshold above the predicted level if the confidence score is insufficient.

17 Claims, 4 Drawing Sheets

ROW-BY-ROW SEGMENTATION AND THRESHOLDING FOR OPTICAL CHARACTER RECOGNITION

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Technical Field

The invention is related to optical character recognition (OCR) systems for microfilm readers and in particular to OCR systems which read microfilm frame numbers.

Background Art

Each document on a roll of microfilm has an associated frame number which serves as a reference to its position on the film. The current method of verifying that a specific document is located is to have a human operator visually read the frame number. It is desirable to have a system for optically reading the frame numbers automatically.

One problem in attempting to read character images —such as microfilm frame numbers—is that the sensitivity of the document scanner must be adjusted to optimize the performance of the OCR system. If the sensitivity is too low, the OCR system may not be able to read faint characters, while if the sensitivity is too high the OCR system may be confused by noise in the image, such noise arising from dirt or fingerprints on the microfilm, for example.

The OCR system must first segment each character in the frame number. In the typical microfilm image, the numerals of each frame number are printed in a vertical column. Therefore, once the imaginary box bounding the frame numerals is located, segmentation in a vertical direction only is sufficient. This fact is exploited in the invention to solve the problem of controlling the sensitivity of the microfilm scanner, as will be described below.

Various techniques are known for selecting the sensitivity of a document scanner. In most of them, the scanner generates an array of pixels representing the image of the scanned document, each pixel comprising, for example, an eight-bit word specifying one of 256 possible gray levels from black to white. Assuming each character is a white symbol printed on a black background, the OCR system employs a selected sensitivity threshold somewhere within the range of the 256 gray levels. Any pixel whose gray level is below the threshold is considered to be part of the background. The foregoing can be performed by the OCR system in the digital domain or by the scanner in the analog domain.

U.S. Pat. No. 3,263,216 (Andrews) discloses the concept of varying the analog (gray level) threshold for scanning printed characters on a document in response to a failure of the pattern recognition system to recognize the current character, scanning the character again using the altered threshold and attempting to recognize the same character. Subsequent attempts to recognize the character may be made while either increasing or decreasing the threshold.

U.S. Pat. Nos. 4,742,556 (Davis, Jr., et al.) and 4,593,325 (Kannapell et al.) disclose image gray level thresholding control based on pixel gray levels in a local neighborhood.

U.S. Pat. Nos. 4,490,852 (Sahni) and 4,731,863 (Sezan et al.) disclose image gray level threshold control based upon gray level peaks in the image.

U.S. Pat. No. 4,829,587 (Glazer et al.) discloses increasing the resolution of a binary image by interpolating with gray level pixels to smooth the transitions between binary black and white pixels.

U.S. Pat. No. 3,868,637 (Schiller) discloses a microfilm frame number reading device using diffraction patterns of a laser beam.

None of the foregoing references provides a way of initializing the sensitivity threshold at the likeliest optimum value before attempting to read a character. Therefore, as in the patent to Andrews referenced above, there is no reliable way to determine whether the threshold should be increased or decreased upon encountering poor results.

In contrast, the present invention vertically segments each numeral in the microfilm frame number from its predecessor while simultaneously determining the likeliest optimum value for the sensitivity threshold before reading the numeral, based upon results obtained during the reading of the preceding numeral and obtained during the segmentation process. This is performed in such a manner that the threshold is initialized at an optimal minimum value. Accordingly, correction of the threshold following failed attempts to read the next character are always performed by increasing the threshold. Therefore, such corrections need not be characterized by the random attempts at increasing and subsequently decreasing the threshold, which characterize the prior art.

DISCLOSURE OF THE INVENTION

The invention is an OCR system for reading microfilm frame numbers. The system of the invention first locates the imaginary box bounding the frame number for a given microfilm frame in accordance with uniform microfilm specifications by detecting a standard fiducial mark in the microfilm image. The bounding box is a vertical rectangle within which the frame numerals are in spaced vertical alignment. The system then extracts and reads each numeral one by one beginning at the top of the bounding box.

During extraction of individual characters or numerals, the invention predicts for the next character an optimal minimum gray level sensitivity threshold while scanning pixel rows between characters by lowering the threshold unless or until noise in the image causes the scanner to detect too many "ON" pixels between adjacent numerals. During each attempted recognition of an extracted character or numeral, the invention computes a confidence value and increases the sensitivity threshold if the confidence value is insufficient before the next attempt to recognize the same character.

Threshold Correction During Character Extraction

After successfully reading the current numeral, the system begins extraction of the next numeral. First, the system proceeds to a location which is a predetermined number of rows (e.g., 4 rows) below the bottom of the numeral previously extracted, which is certain to be between the current numeral and the next numeral. Then, the system determines whether the current row contains less than a predetermined number of pixels (e.g., 5 pixels) whose gray levels are above the sensitivity threshold. If so, the system decreases the gray level sensitivity threshold by a predetermined decrement and repeats this process until either the number of pixels whose gray levels are above the sensitivity threshold exceeds the predetermined number or a minimum threshold value is reached. The system then searches for the top pixel row of the next numeral by looking for the next row having more than another predetermined number of pixels (e.g., 10 pixels) whose gray levels are above the current threshold. The system then searches for the next row having less than the predetermined number of pixels (e.g., 10 pixels) whose gray levels are above the threshold. This second pixel row thus identified is the bottom of the numeral. The image between the top and bottom rows thus identified is then extracted as the next character image to be read. In extracting the image, any pixel whose gray level is below the sensitivity threshold is considered to be a part of the black background and not part of a character stroke. In effect, those pixels having non-zero gray levels below the threshold are discarded as noise.

Threshold Correction During Character Reading

Each extracted character image is read by a feature-based character recognition device, such as a feature-based vector distance recognition device. The system also computes a confidence value proportional to the difference between the distances from the vector representing the extracted character image and the two closest reference vectors representing known symbols. The microfilm frame number OCR system of the present invention determines whether the confidence level is above a minimum value. If the confidence value is not above the minimum level, the system increases the gray level sensitivity threshold by a predetermined increment and repeats the foregoing extraction process pixel row by pixel row. The cycle is repeated until a satisfactory confidence level is attained.

Gray Level to Bi-Tonal Image Conversion

In the preferred embodiment of the invention, the feature-based character recognition device is of the type disclosed in U.S. patent application Ser. No. 520,317 filed May 7, 1990 by Hin Leong Tan entitled "A FEATURE-BASED AND TEMPLATE MATCHING OPTICAL CHARACTER RECOGNITION SYSTEM" and assigned to the assignee of the present application. Such a device requires that the gray level image pixels be converted to bi-tonal pixels. In the invention, this conversion is carried out by considering all pixels whose gray levels are above the sensitivity threshold to be "ON" and all pixels whose gray levels are at or below the sensitivity threshold to be "OFF".

Essentially, during character separation the invention predicts the lowest optimum gray level sensitivity threshold for reading the next character, in response to noise in the empty portions of the image. During the reading of the next character, the invention increases the threshold from the predicted value to the minimum extent necessary, in response to a computed confidence value.

BRIEF DESCRIPTION OF THE DRAWINGS

Preferred embodiments of the invention are described below in detail by reference to the accompanying drawings, of which.

MODES FOR CARRYING OUT THE INVENTION

Figure 1:
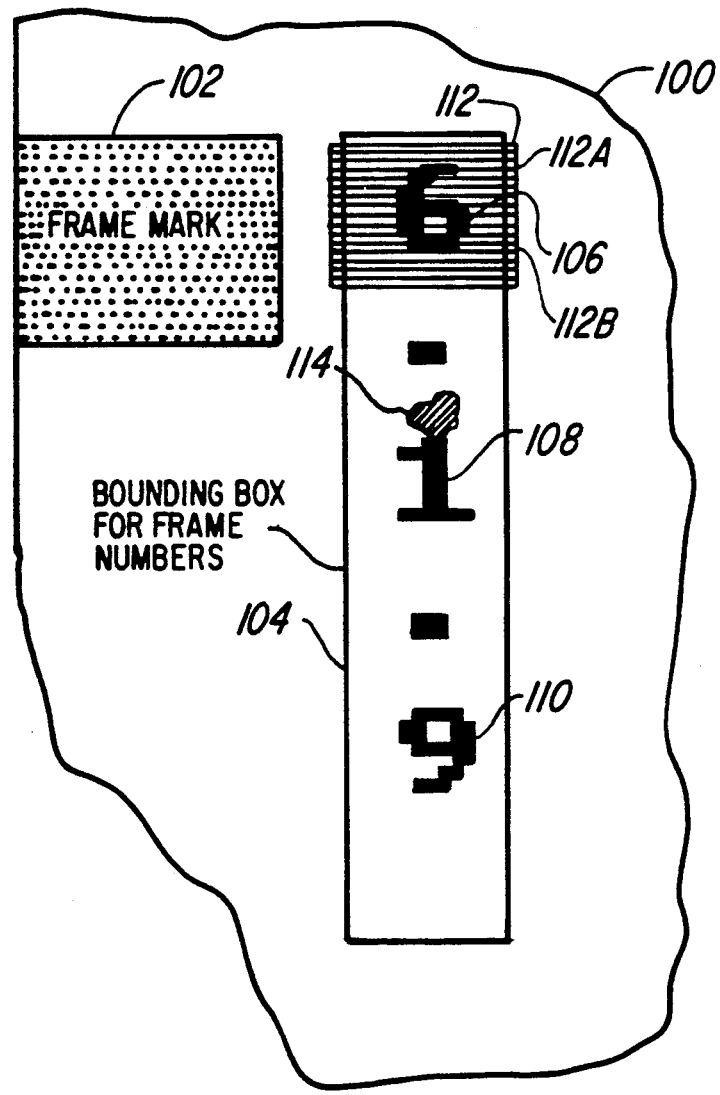
FIG. 1 is a pictorial diagram illustrating the operation of the invention in one example.

Referring to FIG. 1, a microfilm strip 100 has a fiducial frame mark 102 which locates an imaginary bounding box containing vertically aligned numerals 106, 108, 110 defining the microfilm frame number. The invention separates and extracts the image of each individual numeral 106, 108, 110 by processing one by one each horizontal row 112 of image pixels.

Figure 2:
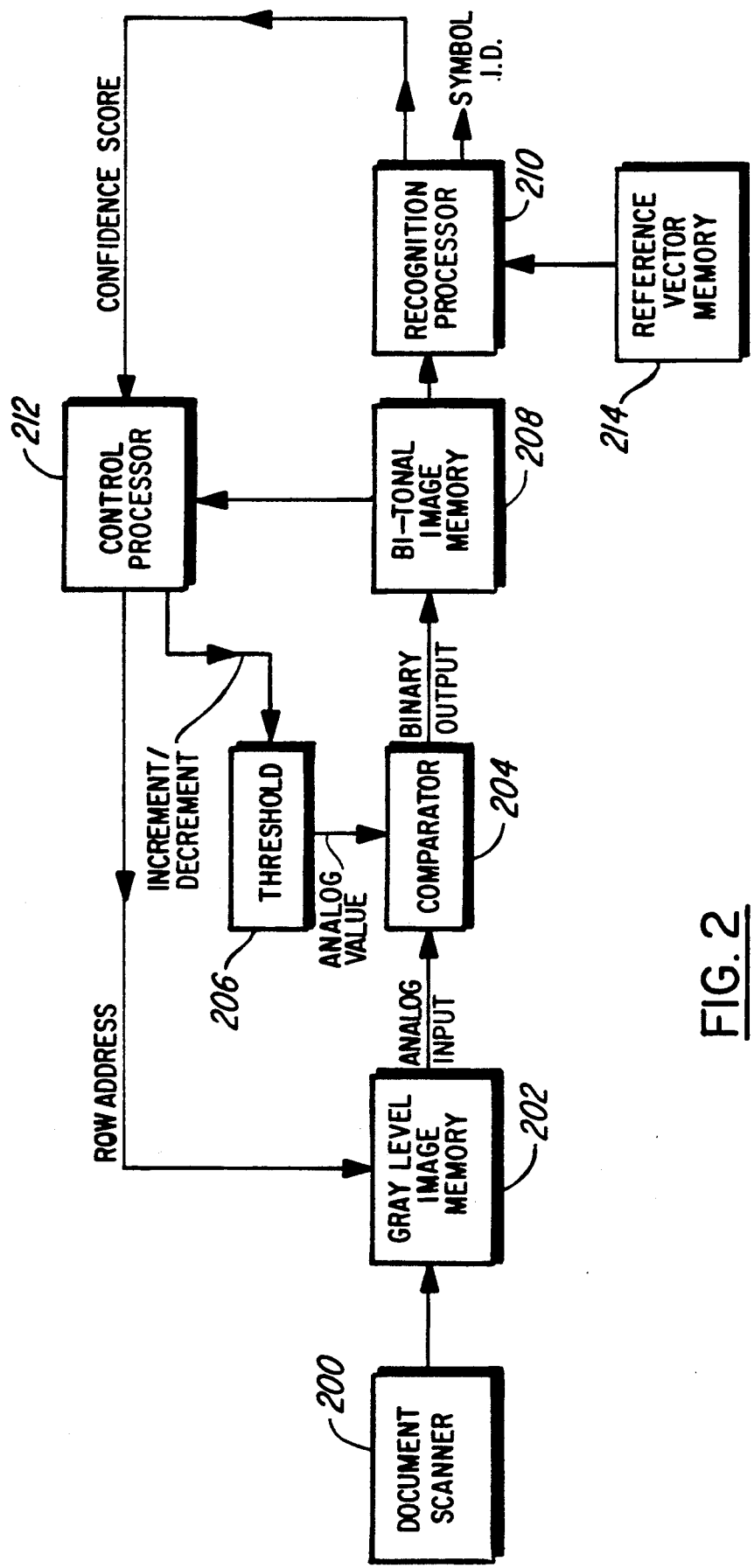
FIG. 2 is a block diagram of a system embodying the invention.

A system embodying the invention is illustrated in FIG. 2. A microfilm scanner 200 scans the microfilm strip 100 of FIG. 1 to generate an array of horizontal rows and vertical columns of image pixels, each pixel having a gray level value within a predetermined range. For example, if each pixel is an eight bit byte, then its gray level may be any one of 256 possible values. A gray level image memory 202 stores the digital image generated by the scanner 200.

A comparator 204 converts each pixel to one of two binary values ("ON" and "OFF") depending upon whether the pixel's gray level is above or below a sensitivity threshold stored in a buffer 206, and stores the results in a bi-tonal image memory 208. A feature-based recognition processor 210 performs feature-based optical character recognition on the bi-tonal image stored in the memory 208 and identifies the image with a known symbol while simultaneously computing a confidence value associated with the identification. A control processor 212 responds to the contents of the bi-tonal image memory during character separation or extraction to correct the gray level sensitivity threshold stored in the buffer 206. The control processor 212 responds to the confidence value generated by the recognition processor 210 during the recognition process performed by the processor 210 to correct the sensitivity threshold stored in the buffer 206.

In the preferred embodiment, the recognition processor 210 implements the system described in U.S. patent application Ser. No. 520,317 filed May 7, 1990 by Hin Leong Tan entitled "A FEATURE-BASED AND TEMPLATE MATCHING OPTICAL CHARACTER RECOGNITION SYSTEM" assigned to the assignee of the present application. However, while the referenced patent application teaches aligning each character image into one corner of the image frame, in the present invention it is preferred to center each character in the image frame.

Operation of the system of FIG. 2 will now be described by reference to the flow diagram of FIG. 3. When the system of FIG. 2 is first initialized, the gray level sensitivity threshold value in the buffer 206 is initialized at an intermediate level between the two extremes of the gray level range of the scanner 200

Figure 3:
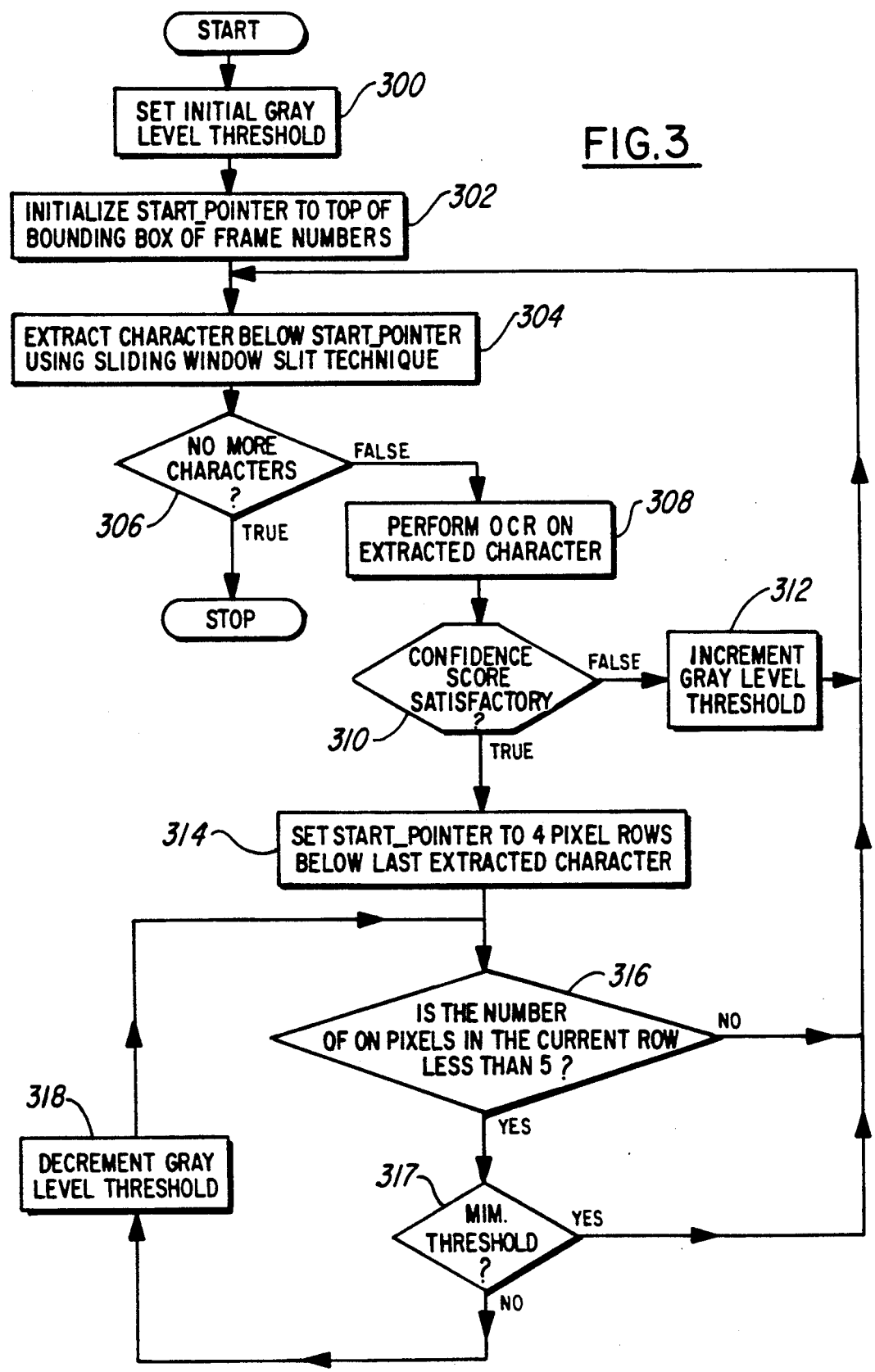
FIG. 3 is a flow diagram illustrating the operation of the system of FIG. 2.

(block 300 of FIG. 3). For example, if the gray level scale of the scanner is 0 to 255 from black to white, the initial level is set to 175. On the other hand, if the gray level scale is 255 to 0 from black to white, the initial threshold level is set to 125. In the preferred embodiment of the invention, this initial threshold level is also the minimum level below which the system will not permit the threshold to be decreased.

The control processor 212 sets a start pointer to the top pixel row 112 of the bounding box 104 of FIG. 1. This corresponds to top row address of the memory 202. The processor 212 then fetches from the gray level image memory the horizontal pixel rows between the rows 112a and 112b bounding the top and bottom of the first numeral 106 (block 304 of FIG. 3). Each pixel thus fetched is compared by the comparator with the sensitivity threshold (206) and the binary result (either "ON" or "OFF") is stored in a corresponding location in the bi-tonal image memory. Provided that there is a character below the current row address (FALSE branch of block 306 of FIG. 3), the top and bottom bounding rows 112a and 112b are found in the step of block 304 by searching down from the first (top) row in the image for the first and last horizontal pixel rows, respectively, whose corresponding bi-tonal image in the memory 208 contains more than a predetermined number of "ON" pixels (preferably, 10 pixels).

The recognition processor 210 then generates a vector from the bi-tonal image data stored in the memory 208 and computes the distances between this vector and the two closest reference vectors stored in a reference vector memory 214 (block 308 of FIG. 3). The recognition processor 210 transmits the ratio of the two distances as a confidence value to the control processor 212, which compares it with a predetermined acceptance level (block 310 of FIG. 3). If the confidence value is below the predetermined acceptance level (FALSE branch of block 310), the control processor 212 increases the contents of the sensitivity threshold buffer 206 by a predetermined increment (block 312 of FIG.) and empties the contents of the bi-tonal memory 208. The system then returns to the step of block 304 and repeats the succeeding steps, so that the gray level image in the memory 202 is again converted to a bi-tonal image accumulated in the memory 208, but with a higher gray level threshold value being used by the comparator 204.

Eventually, an acceptable confidence level is obtained (TRUE branch of block 310 of FIG. 3) so that the recognition processor 210 identifies the current character image with the symbol corresponding to the closest reference vector. In block 314 of FIG. 3, the control processor 212 sets its start pointer four rows below the bottom bounding horizontal row of the previous character found in the step of block 304. If the previous character was the "6" numeral 106 of FIG. 1, then the new start pointer location is four horizontal pixel rows below the row 112b. This guarantees that the pointer is now between adjacent characters where there ideally are no "ON" pixels. Then the control processor 212 counts the number of "ON" pixels in this row. If the number is less than a predetermined number (preferably, 5), this means that the current gray level threshold is more than sufficient to handle local background noise level (YES branch of block 316 of FIG. 3). In this case the control processor 212 decreases the contents of the gray level threshold buffer 206 by a predetermined decrement (block 318 of FIG. 3).

The decrementing process of blocks 316 and 318 is repeated in the current pixel row until either the number of "ON" pixels is above the predetermined number (NO branch of block 316) or the threshold has been decremented to the minimum level (YES branch of block 317). At this point the operation returns to the step of block 304 of FIG. 3.

In one embodiment of the invention, in the step of block 312 of FIG. 3, the control processor 212 keeps count of how many times it has incremented the gray level threshold in response to a poor confidence value. If the count ever exceeds a certain number, the control processor declares a failure and causes the system to begin reading the next character.

Figure 4:
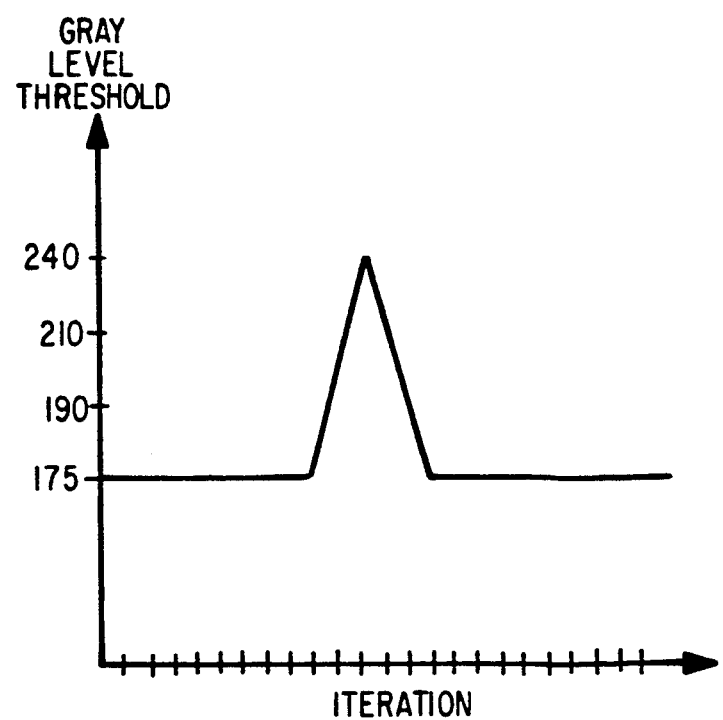
FIG. 4 is a graph depicting fluctuation of the gray level sensitivity under control by the system of FIG. 2 in the example depicted in FIG. 1.

FIG. 4 illustrates how the contents of the gray level threshold buffer 206 fluctuates in the presence of noise in the image, such as a "blob" 114 shown in FIG. 1. If the blob 114 is due to dirt, for example, the pixels in the gray level image stored in the memory 202 which represent the blob tend to have gray levels less than that of the numerals 106, 108, 110. In attempting to read the "1" numeral 108, the recognition processor 210 continues to produce low confidence scores during successive attempts. With each attempt, the control processor 212 raises the gray level threshold until the gray level of the blob 114 is exceeded, and it disappears in the bi-tonal image. This corresponds to the portion of the graph of FIG. 4 in which the threshold value increases over several iterations. At this point the "1" numeral is finally recognized. Then, as the system monitors a selected row in the space in the image between the "1" numeral 108 and the "9" numeral 110, the control processor 212 discovers that the threshold level is well above that required to maintain the count of "ON" pixels in the selected row. Thus, over succeeding iterations, the threshold is decremented back to a minimum level. This corresponds to the portion of the graph of FIG. 4 in which the threshold value decreases over several iterations.

While the invention has been described as processing a document image in which successive characters are aligned vertically above one another by segmented the characters by horizontal rows, the invention is equally useful with a document image in which the characters are aligned horizontally and lie vertically upright as in normal text. In the latter case, the invention segments the characters by vertical rows, and pixel columns may be considered to extend horizontally.

A computer program in C-language which implements the invention is attached hereto as Appendix A. In this program, the gray level scale is 255 to zero from black to white and the minimum gray level threshold is 125.

While the invention has been described in detail by specific reference to preferred embodiments thereof, it is understood that variations and modifications may be made without departing from the true spirit and scope of the invention.

What is claimed is:

1. An optical character recognition system which recognizes an individual character in a thresholded image generated from a gray level document image by associating said character with the one symbol in a predetermined symbol set having the greatest similarity to said character, and computes a corresponding confidence score which is a function of the similarity of the character to the symbol having the greatest similarity and the similarity of the character to another one of the symbols having the next greatest similarity, said document image comprising an array of columns and rows of pixels and characterized by a succession of characters and spaces separating adjacent ones of said characters, said system comprising:

thresholding means for discounting those pixels in said document image having a gray level below a certain threshold, whereby to generate said thresholded image from said document image;

gray level threshold prediction means for determining a minimum value of said threshold at which the number of pixels not discounted by said thresholding means in a portion of one of said spaces is less than a background noise level and for reducing said threshold to said minimum value; and gray level threshold correction means responsive to the confidence score corresponding to the thresholded image of one of said characters for increasing said threshold from said minimum value to a new threshold whenever the corresponding confidence score is below a predetermined score, whereby said thresholding means generates another thresholded image of said one character corresponding to a higher confidence score.

2. The system of claim 1 wherein said characters are arranged in a linear succession and wherein said gray level threshold prediction means comprises:

noise level detection means for determining in pixel rows in said image the count of pixels not discarded by said thresholding means, whereby said portion of one of said spaces comprises one of said rows;

sensitivity enhancement means responsive upon said noise level detection means determining said count for one of said rows for decreasing said threshold by a predetermined decrement whenever said count is less than a first number; and character separation means responsive upon said noise level detection means generating a count above a second number for defining the corresponding one of said rows as the top bounding row of the next one of said characters.

3. The system of claim 2 wherein said character separation means further comprises means responsive following the defining of said top bounding row and upon said noise level detection means generating a count below a third number for defining the corresponding row as the bottom bounding row of said next one character.

4. The system of claim 3 further comprising feature-based character recognition means for identifying the portion of said thresholded image between said top and bottom character bounding rows with a known symbol and a corresponding confidence score.

5. The system of claim 4 wherein said recognition means comprises:

means for computing the distances between a vector representing said image portion and the two closest ones of a set of reference vectors representing a set of known symbols;

means for identifying the symbol corresponding to the closest one of said reference vectors; and means for computing said confidence score as the ratio between said distances.

6. The system of claim 3 wherein said first number is 5 pixels and said second and third numbers are both 10 pixels.

7. The system of claim 1 wherein said thresholding means comprises means for converting all discarded pixels to an "OFF" value and all other pixels to an "ON" value whereby said thresholded image comprises a bi-tonal image.

8. In an optical character recognition system which recognizes an individual character in a thresholded image generated from a gray level document image by associating said character with the one symbol in a predetermined symbol set having the greatest similarity to said character, and computes a corresponding confidence score which is a function of the similarity of the character to the symbol having the greatest similarity and the similarity of the character to another one of the symbols having the next greatest similarity, said document image comprising an array of columns and rows of pixels and characterized by a succession of characters and spaces separating adjacent ones of said characters, a method for operating said system, comprising:

discounting those pixels in said document image having a gray level below a certain threshold, whereby to generate said thresholded image from said document image;

determining a minimum value of said threshold at which the density of pixels not discounted by said discounting step in a portion of one of said spaces is less than a background noise level;

reducing said threshold to said minimum value; and increasing said threshold from said minimum value to a new threshold whenever the thresholded image of one of said characters is read with a corresponding confidence score below a predetermined score.

9. The method of claim 8 further comprising:

generating another thresholded image of said one character and repeating said increasing step in a cycle which continues until said character is read with a confidence score not below said predetermined score.

10. The method of claim 8 wherein said characters are arranged in a linear succession and wherein said determining step comprises:

determining in individual pixel rows in said image the count of pixels not discounted by said discounting step, whereby said portion of one of said spaces comprises one of said rows;

decreasing said threshold by a predetermined decrement if said count in a selected one of said rows is less than a first number; and if said count is above a second number, defining the corresponding one of said rows as the top bounding row of the next one of said characters.

11. The method of claim 10 further comprising a step following the defining of said top bounding row, and upon said count being below a third number, of defining the corresponding row as the bottom bounding row of said next one character.

12. The method of claim 11 further comprising identifying the portion of said thresholded image between said top and bottom character bounding rows with a known symbol and a corresponding confidence score.

13. The method of claim 12 wherein said identifying step comprises:

computing the distances between a vector representing said image portion and the two closest ones of a set of reference vectors representing a set of known symbols;

identifying the symbol corresponding to the closest one of said reference vectors; and computing said confidence score as the ratio between said distances.

14. The method of claim 11 wherein said first number is 5 pixels and said second and third numbers are both 10 pixels.

15. The method of claim 8 further comprising converting all discarded pixels to an "OFF" value and all other pixels to an "ON" value whereby said thresholded image comprises a bi-tonal image.

16. The method of claim 8 wherein said function of said confidence score comprises the difference between said greatest similarity and said next greatest similarity.

17. The method of claim 8 wherein said function of said confidence score comprises the ratio between said greatest similarity and said next greatest similarity.

* * * * *